United States Patent [19]
Baskett

[11] Patent Number: 5,060,732
[45] Date of Patent: Oct. 29, 1991

[54] CYLINDER-TYPE GROUND-RAKING ATTACHMENT FOR A BUCKET-EQUIPPED TRACTOR

[76] Inventor: Theodore N. Baskett, 9514 Portland Ave., Tacoma, Wash. 98441

[21] Appl. No.: 518,494

[22] Filed: May 3, 1990

[51] Int. Cl.$^5$ .............................................. A01D 19/02
[52] U.S. Cl. ..................................... 171/63; 171/19; 171/98; 37/117.5; 37/189; 37/DIG. 3; 37/DIG. 12; 299/89
[58] Field of Search ............. 37/66, 86, 87, 94, 117.5, 37/142 R, 189, 248, 249, DIG. 3, DIG. 12, DIG. 9; 171/19, 63, 98, 116; 299/89, 91, 93

[56] References Cited
U.S. PATENT DOCUMENTS

| | | | |
|---|---|---|---|
| 2,221,236 | 11/1940 | Gay, Jr. ............................... | 198/160 |
| 2,755,092 | 7/1956 | Donahue ......................... | 37/117.5 X |
| 3,092,919 | 6/1963 | Reynolds et al. .................. | 37/117.5 |
| 3,461,579 | 8/1969 | Turner ................................ | 37/189 |
| 3,637,024 | 1/1972 | Baskett ................................ | 171/63 |
| 3,810,512 | 5/1974 | Porter ................................ | 171/14 |
| 3,951,459 | 4/1976 | Honecutt, Jr. ..................... | 37/87 X |
| 4,113,023 | 9/1978 | Baskett ............................... | 171/63 |
| 4,344,239 | 8/1982 | Verboom ............................. | 37/66 |
| 4,364,434 | 12/1982 | Erholm .............................. | 171/63 |
| 4,550,465 | 11/1985 | Chrisley ............................ | 171/63 X |
| 4,755,001 | 7/1988 | Gilbert .............................. | 37/87 X |
| 4,872,977 | 10/1989 | Jackson ........................... | 37/117.5 X |

Primary Examiner—David H. Corbin
Assistant Examiner—Arlen L. Olsen
Attorney, Agent, or Firm—Eugene D. Farley

[57] ABSTRACT

A ground raking attachment for bucket-equipped tractor includes a toothed, cylindrical rotor which works the soil and at the same time rakes the ground free of rocks, refuse, roots, sticks and other debris which is transferred to the tractor bucket by the action of the rotor.

7 Claims, 3 Drawing Sheets

CYLINDER-TYPE GROUND-RAKING ATTACHMENT FOR A BUCKET-EQUIPPED TRACTOR

The present invention pertains generally to ground-raking attachments for bucket-equipped tractors. It pertains particularly to attachments for bucket-equipped tractors of the class described in my prior patents U.S. Pat. Nos. 3,637,024 and 4,113,023 which adapt a tractor to raking the ground and transferring rocks and other litter from the surface of the ground to the bucket of the tractor.

BACKGROUND AND GENERAL STATEMENT OF THE INVENTION

During the construction of buildings, there is use for tractor-mounted apparatus for removing debris from the construction site, for leveling the site, and for preparing the ground for seeding with grass seed. In gardening and farming operations there exists a need for a tractor-mounted apparatus which will remove sticks, roots and small rocks from ground to be planted and which will otherwise prepare the ground for seeding with a selected crop.

It is the general purpose of the present invention to provide such an apparatus. The apparatus has all of the characteristics and purposes of the apparatus described in my U.S. patents aforesaid. In addition, it is characterized by superiority thereover with respect to simplicity of construction, substantially less weight, and substantially lower cost.

In addition, the presently described embodiment of the invention is easily applied as an attachment to a diversity of bucket-equipped tractors, is installed removably with particular facility, is relatively maintenance free, and is of improved versatility and operating efficiency.

Broadly stated, the presently described ground raking attachment for bucket-equipped tractors comprises a frame and mounting means for mounting the frame on the bucket across the open front end thereof. A toothed, substantially cylindrical rotor is mounted on the frame. Rotor drive means is connected to the rotor for imparting thereto rotary motion in the rotational direction of bucket filling.

Means is provided for deflecting rocks and other debris processed by the rotor into the bucket. Means also is provided for adjusting the elevation and angular position of the assembly with reference to the bucket as required for execution of the various operations of the assembly.

THE DRAWINGS

Figure 1:
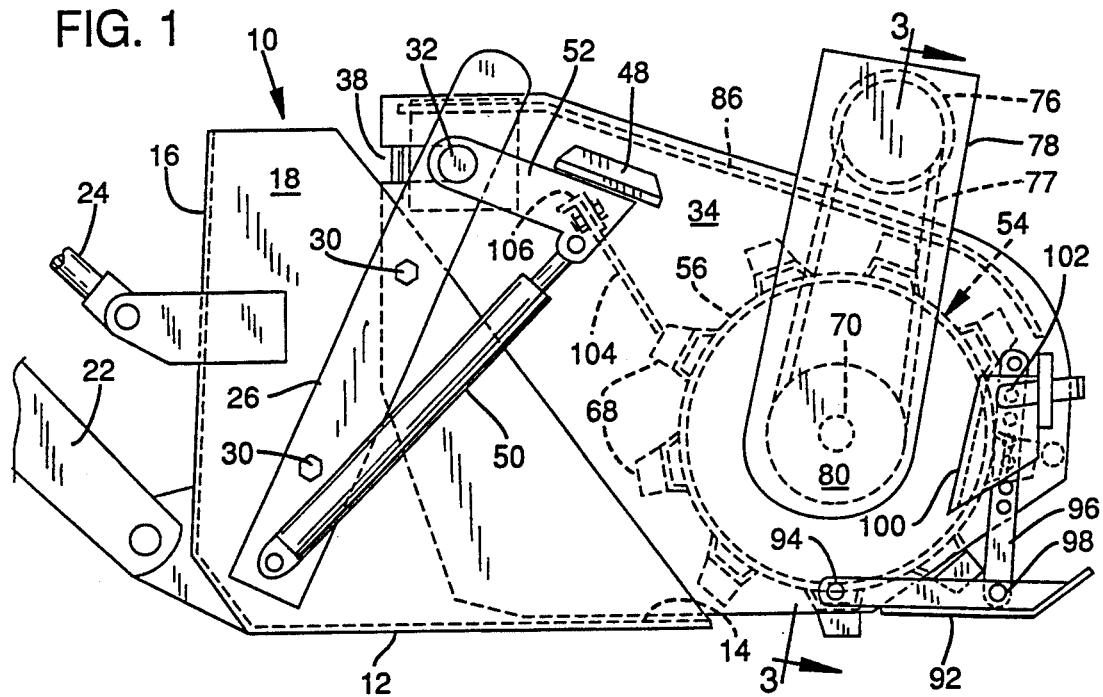
FIG. 1 is a view in side elevation of the herein described cylinder-type ground raking attachment for bucket-equipped tractor illustrated in its operative position, mounted on the bucket of the tractor, in a first operating mode.

FIGS. 5-9, inclusive, are schematic views illustrating the manner of operation of the attachment in filling the tractor bucket.

DESCRIPTION OF A PREFERRED EMBODIMENT OF THE INVENTION

As indicated in the drawings, the herein described ground raking attachment is designed for use in conjunction with a tractor having a material-handling bucket indicated generally at 10. The bucket is of conventional construction and includes a bottom 12 with lip portion 14, a back wall 16, and a pair of end walls 18, 20. These define an open front end or mouth through which the bucket is filled and emptied.

The bucket is manipulated by the usual hydraulic drives including the lift arm 22 by means of which it is raised and lowered and the associated tilting linkage 24 by means of which it is adjusted to a multiplicity of angular positions about its horizontal axis.

Figure 2:
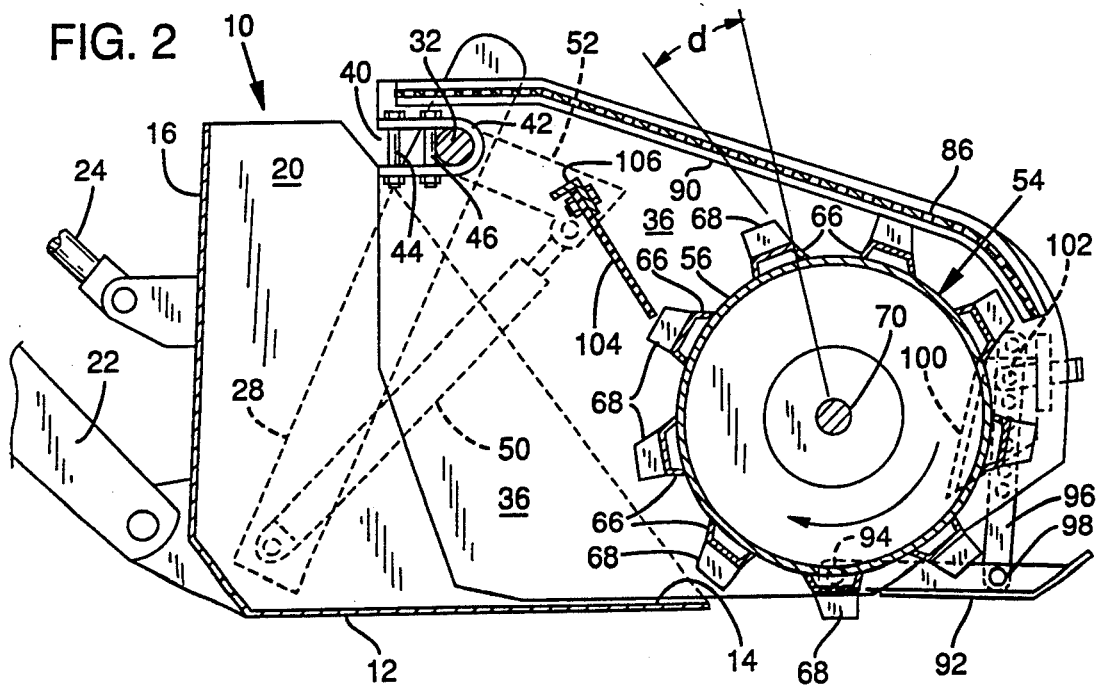
FIG. 2 is a longitudinal section of the attachment.

The ground raking attachment, which is the subject of the present invention, is mounted on the bucket by means of a frame which includes a pair of upwardly extending support arms 26, 28. These are attached to the side walls of the bucket by means of bolts 30. They are angled forwardly and extend outwardly and upwardly beyond the plane of the bucket, as shown in FIGS. 1 and 2.

In the area toward the top of the bucket, support arms 26, 28 journal a transverse support shaft 32.

A pair of side plates 34, 36 having forward and rearward portions with reference to the open end of the bucket are suspended on shaft 32. The side plates are contoured and dimensioned for insertion between bucket end walls 18, 20, one on each side of the bucket.

The inner, upper margins of frame side plates 34, 36 have notches 38, 40 respectively. U-shaped bearing plates, one of which is indicated at 42 of FIG. 2, are welded to the inner faces of the plates, framing or surrounding the notches. These form in effect the knuckles of hinges by means of which side plates 34, 36 are pivotally mounted on shaft 32 in floating arrangement.

Spaced gravity pins 44, 46 penetrating openings in the bearing plates serve as keepers for positioning the shaft in one of two positions of adjustment for positioning frame plates 34, 36 inwardly and outwardly with respect to the bucket.

Means is provided for lifting frame side plates 34, 36 to selected positions of angular adjustment during operation of the attachment. Such means comprise lift means positioned on the frame for thrusting against the side plates and lifting them angularly upwardly, after which they may be permitted to gravitate downwardly to further positions of angular adjustment.

In the illustrated form of the invention, the lift means comprises at least one outwardly extending abutment 48 welded to the exterior face of one of the side plates, e.g. side plate 34 in the illustration. The abutment cooperates with motor driven lever means mounted on the frame and positioned for thrusting engagement with the abutment.

To this end there is provided a fluid operated cylinder 50, which may be controlled and actuated by the hydraulic system of the tractor. The case of the cylinder is pivotally connected to the bottom portion of support arm 26. Its piston rod is pivotally connected to the outer end of a lever 52. The inner end of the lever is fixed to the outer end of shaft 32.

Extension of the piston of cylinder 50 causes the outer end of lever arm 52 to bear against abutment 48, thrusting frame plates 34, 36 upwardly. Retraction of the piston rod of the cylinder permits the frame plates to gravitate downwardly until the rotor drags on the ground, if desired.

Supported by the forward portions of frame side plates 34, 36 is the toothed cylindrical rotor by means of which bucket 10 is filled. The construction of the rotor assembly, is illustrated particularly in FIGS. 2 and 3.

The toothed rotor assembly, indicated generally at 54, has for its function rototilling the soil, raking out rocks and other solid debris, and impelling the debris into the adjacent tractor bucket with which it cooperates. It is substantially cylindrical in cross section. The feature is responsible for its efficient operation and distinguishes it from the rotors employed in the ground raking attachments described in U.S. Pat. Nos. 3,637,024 and 4,113,023, referenced hereinabove.

In the illustrated form of the invention the rotor comprises a hollow drum. The drum may comprise a pipe 56 having a length slightly less than the distance between frame side plates 34, 36. This makes possible shielding both the drum interior and the support bearings from damage by rocks. To this end, the drum is fitted with recessed end plates 58, 60, FIG. 3. Wear strips 62, 64 are welded to the inner, lower faces of frame side plates 34, 36 to assist in this purpose.

A problem associated with the operation of a toothed drum is the wedging of rocks between the teeth if long teeth are employed. Long teeth also are subject to breakage. On the other hand, the rotor teeth must have an effective length which is substantial in order to obtain the required purchase when they engage rocks of several inches in diameter.

This problem is overcome in the presently described toothed rotor construction by fitting the exterior of rotor 56 with a plurality of spaced ribs 66 arranged parallel to the longitudinal axis of the rotor and positioned above its peripheral surface in the illustrated manner. The ribs preferably comprise channel shaped members having a truncated triangle configuration in cross section. They are wider at their bases, adjacent the rotor, than at their outer portions, FIG. 2. This configuration aids in preventing rocks from lodging between the teeth.

Each rib 66 mounts a plurality of longitudinally spaced, transversely arranged tooth bars 68. These comprise segments of stout bar stock welded to the ribs in the indicated manner. They preferably are contoured to slope rearwardly with reference to the direction of drum rotation. If this is the case, the teeth meet squarely the rocks and other obstructions and impel them into the bucket in the manner particularly apparent in FIG. 2.

Although the degree of tooth slope is somewhat variable, I have found that an angular deviation "d" of from 5-25 degrees from the radial direction is most effective.

The tooth construction thus described accordingly overcomes the principal problems associated with the operation of apparatus of this class, i.e. ineffective delivery of rocks into the bucket, tooth breakage, and lodgment of rocks and other debris between the teeth.

The rotor assembly 54 is mounted on a rotor shaft 70 journaled in bearings 72, 74 mounted on the inner faces of frame side plates 34, 36 respectively. The rotor assembly is thus mounted between the frame side plates in such a position that it lies across the open mouth of bucket 10 closely adjacent but, in its operative position, slightly spaced from the lip 14 of bucket floor 12. The orientation is such that the longitudinal axis of the rotor is substantially parallel to the longitudinal axis of the bucket.

Rotor assembly 54 is driven at a relatively slow rotational speed in order to sift out the dirt from the rocks and other debris of greater magnitude. This is accomplished by means of a drive which includes a motor 76 mounted on a standard 77 extending upwardly from frame side plate 34. The motor preferably comprises a rotary hydraulic motor and is included in the tractor hydraulic system.

Motor 76 drives rotor 54 at the desired rotational speed through a chain and sprocket drive 78 which interconnects the motor shaft with the outwardly extending end of rotor shaft 70.

A case 80 protects the drive unit. It may bear a sealed relationship to the exterior face of plate 34 and provide, in its lower portion, a crank case for heavy lubricating oil 82.

Figure 3:
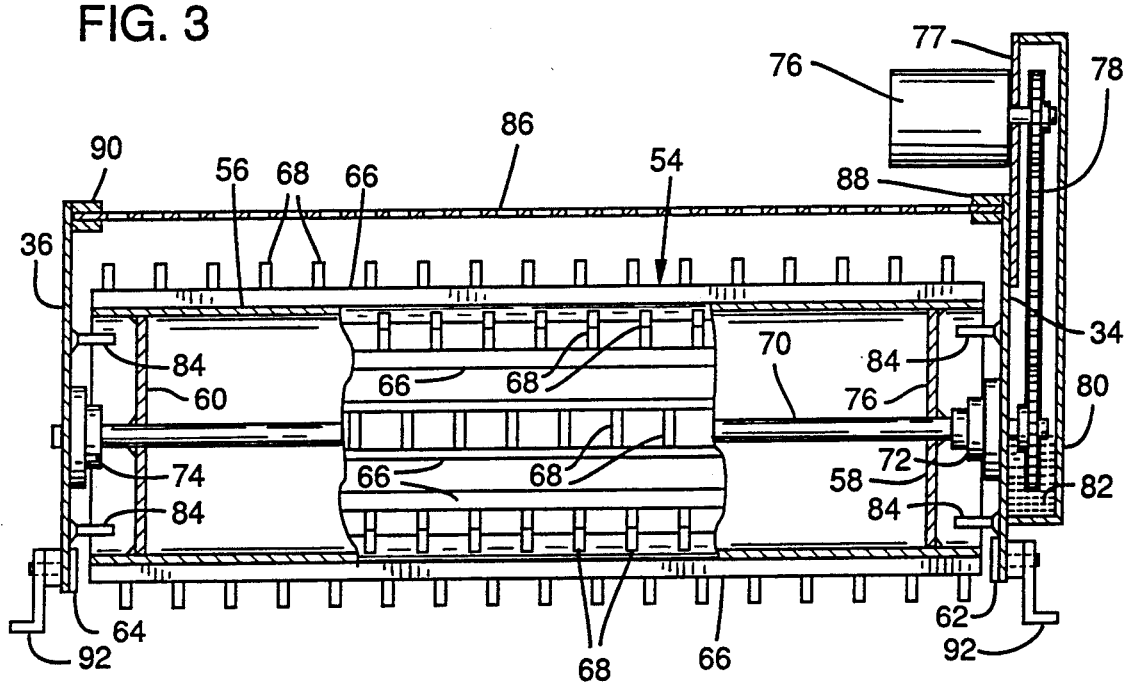
FIG. 3 is a transverse section taken along line 3—3 of FIG. 1, partly broken away to show interior construction.

Anti-fouling pins 84, FIG. 3, are welded to the inner faces of frame plates 34, 36 and extend inwardly into the recess between rotor end plates 58, 60 and the frame side wall plates. The pins protect bearings 72, 74, particularly from wire and the like which might be encountered by the rotor as it does its work, by causing such wire and the like to wrap around the pins 84 rather than around the bearings.

A heavy gauge screen 86 is mounted in retainers 88, 90, FIG. 3, across the top of the rotor. It screens the environment from the impact of rocks and other debris which might be broadcast by the rotor during its operation.

Leveling shoes or feet are provided to support the rotor and position it properly relative to the mouth of bucket 10.

To this end there is mounted on the rearward portion of each side plate an elongated shoe 92, FIG. 1. The inner end of the shoe is pivotally connected to frame plate 34 by means of pivot pin 94. The outer end of the shoe is supported adjustably by means of an elongated, vertically arranged, perforated support arm 96. The lower end of the support arm is pivotally connected to the shoe by pivot pin 98. Its upper end is received in a guide 100. The arm is held within the guide in the selected position of vertical adjustment by means of a retaining pin 102.

It is a particular feature of the invention that the weight of the entire attachment may be kept to a minimum, with attendant ease of handling and reduction in cost. If this is to be done, it is essential that rotor 54 be kept relatively small.

This desideratum conflicts with the necessity of filling the bucket completely during operation of the attachment.

Figure 5:
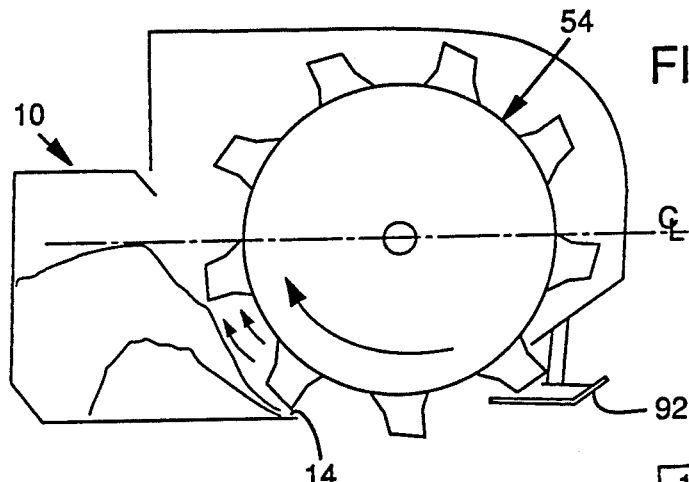

As shown in FIG. 5, I have found that a cylindrical rotor positioned and used in the indicated manner will fill the bucket only to about the rotor center line. This obviously requires a rotor of enormous and impractical size.

Figure 6:
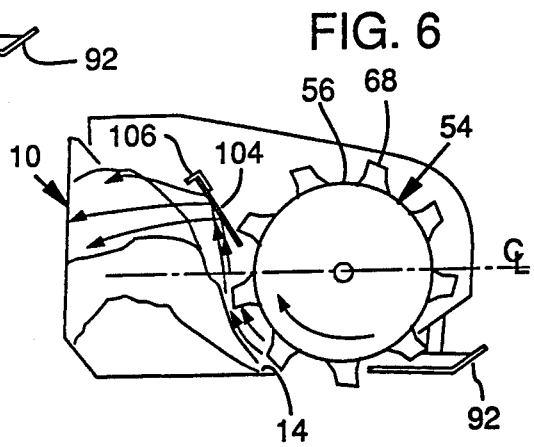

I also have discovered, that if a rock deflector is employed in conjunction with the rotor, the bucket may be filled completely using a rotor of comparatively small size, i.e. having a diameter of only about one-third to three quarters of the bucket height, as shown in FIG. 6.

This is for the reason that during operation of the rotor of smaller diameter, the rotor acts to fill the bucket directly with rocks of large size. Smaller rocks are impelled by the rotor against a suitably angled deflector positioned near the top of the bucket which deflects them into the bucket, thus filling it completely.

The deflector means I employ for this purpose is illustrated particularly in FIG. 2. It preferably comprises a strip of resilient belting 104 bolted to an angle iron support 106 which is welded between the frame side plates 34, 36. The deflector is placed near the upper portion of the unit, closely adjacent the rotor, and mounted at such an angle that rocks impelled against it by operation of the rotor will be deflected into the upper portion of the bucket.

OPERATION

The herein described ground raking attachment for bucket equipped tractors is versatile and capable of at least three different modes of operation.

Figure 4:
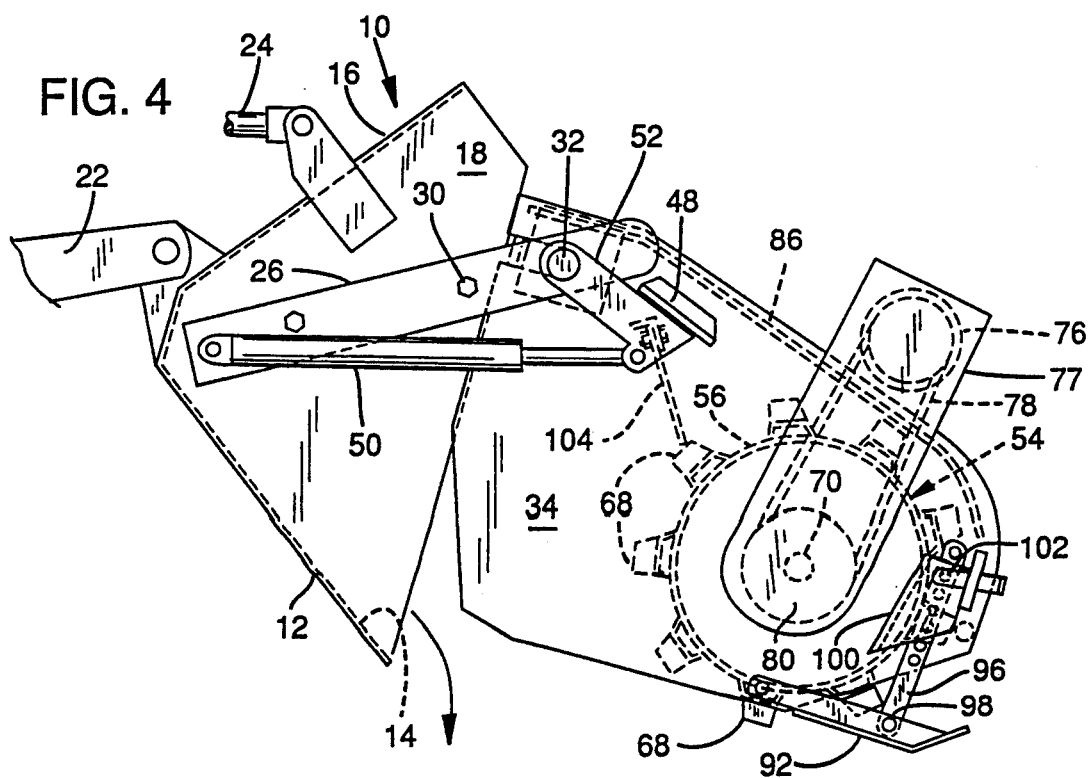
FIG. 4 is a view of the unit in side elevation, similar to FIG. 1, but illustrating an alternate mode of operation.

In one, where ground is to be worked to a selected depth, the mode illustrated in FIG. 4 is employed. In this mode the bucket 10 of the tractor is elevated and tilted and is not used for collection.

However, as the attachment is drawn over the ground, with the tractor in reverse, the ground is worked and rocks, roots and other debris are dug out of the ground and conveyed centrally of the apparatus by the action of teeth 68. They are deposited centrally of the rotor in windrows.

In the second mode of operation, the rotor and bucket are adjusted to the positions of 1 and 2.

Figure 7:
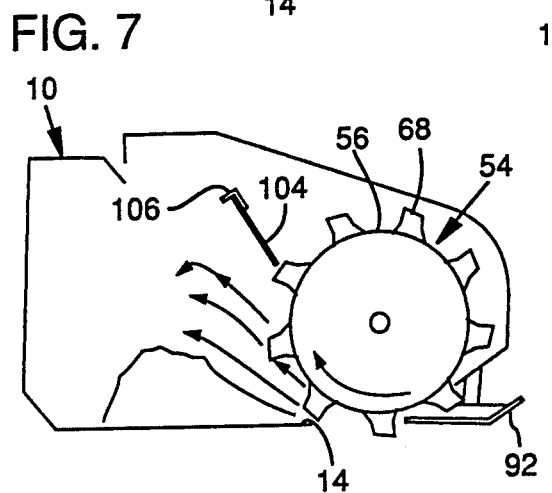
Figure 8:
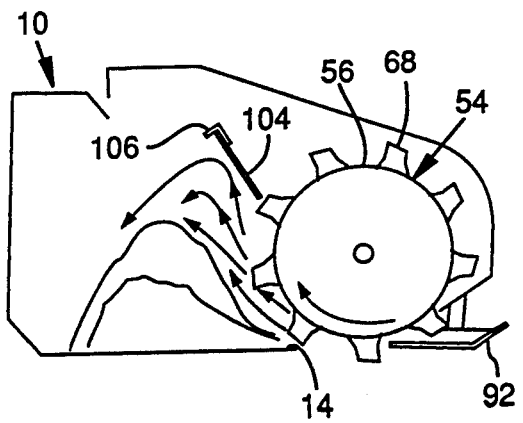
Figure 9:
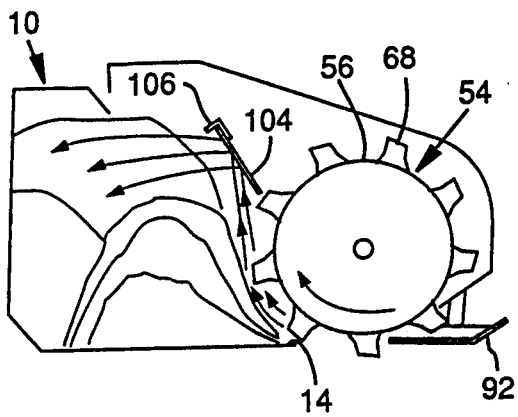

In this mode the apparatus is drawn along the windrows formed as described above and used to collect the rocks and other debris. As it is drawn along the windrows, the progressive operations illustrated in FIGS. 7, 8 and 9 take place. Revolving at a predetermined and relatively low rotational speed, the teeth on the drum transfer the rock to the bucket, depositing it principally along bucket lip 14. This creates a rock wall at the front of the bucket as illustrated in FIG. 7. It forms what may be termed a chute between the wall and the rotor with the result that as more rock is driven by the rotor it is thrown upwardly against deflector 104, as illustrated in FIG. 8. Continued operation of the rotor results in filling the back and upper portions of the bucket as shown in FIG. 9.

However, it is to be noted that when raking large rocks having diameters of from 3 to 6 inches the deflector plays little part in loading the bucket to capacity. The sheer power behind a large rock entering the bucket forces all other rocks in its path to give way.

On occasion, the teeth will pick up and rotate a root or bundle of wire. In this event it is desirable for deflector 104 to be made of a flexible material, such as rubber belting. Anti-fouling pins 84 prevent such material from winding around rotor shaft 70.

It is to be noted further that the rearwardly sloping angle of the teeth facilitates driving the rocks to the rear of the bucket since the sloping faces of the teeth will engage the rocks squarely.

Still a further mode of operation of the attachment involves the application of leveling shoes 92.

Since an average attachment weighs 400 to 600 lbs, when the rotor revolves it will alternately bring the weight of the attachment to bear on each row of teeth as they contact the ground. This pressure makes possible "rotivating" the top 1 or 2 inches of the soil, leveling bumps and filling tire ruts, etc. This is done by adjusting the apparatus to the position of FIG. 4 and allowing only the drum to loosen and level the soil.

Having thus described in detail a preferred embodiment of the present invention, it will be apparent to those skilled in the art that various physical changes could be made in the device described herein without altering the inventive concepts and principls embodied. The present embodiment is therefore to be considered in all respects as illustrative and not restrictive, the scope of the invention being indicated by the appended claims.

I claim:

1. For use with a tractor having a material-handling bucket including a pair of spaced side walls and an open front end, a ground-raking attachment comprising:
    a) a frame including a pair of side plates dimensioned and contoured for insertion between the bucket side walls, one on each side of the bucket, the plates having forward and rearward portions,
    b) frame-mounting means mounting the frame on the bucket and including a pair of upwardly extending arms on the bucket side walls, a shaft supported between said arms, and hinge means hinging the rearward portions of the frame side plates to the shaft for freely pivotal suspension thereon,
    c) a toothed, substantially cylindrical rotor,
    d) rotor-mounting means mounting the rotor for axial rotation between the forward portions of the side plates of the frame across the open front end of the bucket,
    e) rotor drive means connected to the rotor for imparting thereto rotary motion in the rotational direction of bucket filling, and
    f) a pair of leveling shoe means mounted on the forward portion of each frame side plate and configured for ground contact, each leveling shoe means comprising an elongated, ground engaging shoe having inner and outer ends, pivotal attaching means pivotably attaching the inner end of the shoe to the adjacent side plate, and an elongated adjustment arm pivoted at one of its ends to the shoe intermediate the ends of the shoe and connected adjustably to the side plate at the other of its ends.

2. For use with a tractor having a material-handling bucket including a pair of spaced side walls and an open front end, a ground-raking attachment comprising:
    a) a frame including a pair of side plates dimensioned and contoured for insertion between the bucket side walls, one on each side of the bucket, the plates having forward and rearward portions,
    b) frame-mounting means mounting the frame on the bucket and including a pair of upwardly extending arms, a shaft supported between the arms, and hinge means hinging the rearward portions of the frame side plates to the shaft for freely pivotal suspension thereon,
    c) a toothed, substantially cylindrical rotor,
    d) rotor-mounting means mounting the rotor for axial rotation between the forward portions of the side plates of the frame across the open front end of the bucket,
    e) rotor drive means connected to the rotor for imparting thereto rotary motion in the rotational direction of bucket filling, and
    f) a plurality of pins extending inwardly from the frame side plates about the rotor-mounting means to protect the rotor-mounting means from fouling by wire and other debris processed by the attachment.

3. For use with a tractor having a material-handling bucket including a pair of spaced side walls and an open front end, a ground-raking attachment comprising:
 a) a frame including a pair of side plates dimensioned and contoured for insertion between the bucket side walls, one on each side of the bucket, the plates having forward and rearward portions,
 b) frame-mounting means mounting the frame on the bucket and including a pair of upwardly extending arms on the bucket side walls, a shaft supported between said arms, and hinge means hinging the rearward portions of the frame side plates to the shaft for freely pivotal suspension thereon,
 c) a substantially cylindrical rotor,
 d) rotor-mounting means mounting the rotor for axial rotation between the forward portions of the side plates of the frame across the open front end of the bucket,
 e) rotor drive means connected to the rotor for imparting thereto rotary motion in the rotational direction of bucket filling,
 f) a plurality of circumferentially spaced ribs on the rotor extending parallel to the rotational axis of the rotor and projecting outwardly from the rotor,
 g) a plurality of laterally spaced teeth mounted on and projecting outwardly from the ribs, the edge of the teeth leading in the direction of rotor rotation sloping outwardly in the rearward direction,
 h) a deflector mounted on the frame and extending parallel to and adjacent the upper rearward side of the rotor, the deflector extending angularly upward and rearward from the rotor for deflecting rocks into the bucket,
 i) a pair of leveling shoe means mounted on the forward portion of each frame side plate and configured for ground contact, each leveling shoe means comprising an elongated, ground engaging shoe having inner and outer ends, pivotal attaching means pivotably attaching the inner end of the shoe to the adjacent side plate, and an elongated adjustment arm pivoted at one of its ends to the shoe intermediate the ends of the shoe and connected adjustably to the side plate at the other of its ends, and
 j) a plurality of pins extending inwardly from the frame side plates about the rotor-mounting means to protect the rotor-mounting means from fouling by wire and other debris processed by the attachment.

4. For use with a tractor having a material-handling bucket including a pair of spaced side walls and an open front end, a ground-raking attachment comprising:
 a) a frame comprising a pair of side plates dimensioned and contoured for insertion between the bucket side walls, one on each side of the bucket, the plates having forward and rearward portions,
 b) frame-mounting means for mounting the frame on the bucket, the frame-mounting means comprising a pair of upwardly extending arms, a shaft supported between the arms, hinge means hinging the rearward portions of the side plates to the shaft for freely pivotal suspension thereon, the hinge means comprising notches on the inner margin of each side plate dimensioned for receiving the shaft, U-shaped bearing plates framing the notches, and keepers penetrating the bearing plate for retaining the shaft in the notches,
 c) a substantially cylindrical rotor,
 d) rotor-mounting means mounting the rotor between the forward portions of the plates for axial rotation on the frame across the open front end of the bucket,
 e) rotor drive means connected to the rotor for imparting thereto rotary motion in the rotational direction of bucket filling,
 f) a plurality of circumferentially spaced ribs on the rotor extending parallel to the rotational axis of the rotor and projecting outwardly from the rotor, and
 g) a plurality of laterally spaced teeth mounted on and projecting outwardly from the ribs, the edge of the teeth leading in the direction of rotor rotation sloping outwardly in the rearward direction.

5. The ground raking attachment of claim 4 wherein there are a plurality of spaced keepers to provide a plurality of positions of adjustment for the shaft relative to the side plates.

6. The ground raking attachment of claim 4 including:
 a) lift means positioned on the frame for thrusting against the side plates and lifting said side plates and the rotor mounted on said side plates in an angular and upward direction,
 b) leveling shoe means and mounting means for mounting the same on the rearward portions of each side plate; and
 c) deflector means with associated deflector mounting means for mounting the deflector means on the frame for deflecting into the bucket solid objects discharged by the rotor.

7. For use with a tractor having a material-handling bucket including a pair of spaced side walls and an open front end, a ground-raking attachment comprising:
 a) a frame;
 b) frame-mounting means for mounting the frame on the bucket,
 c) a toothed, substantially cylindrical rotor,
 d) rotor-mounting means mounting the rotor for axial rotation on the frame across the open front end of the bucket,
 e) rotor drive means connected to the rotor for imparting thereto rotary motion in the rotational direction of bucket filling, and
 f) a deflector comprising a length of resilient belting mounted on the frame and extending parallel to the rotor adjacent the upper rearward side of the rotor, the deflector extending angularly upwardly and rearward from the rotor for deflecting rocks into the bucket.

* * * * *